(No Model.)

G. W. HUCKABAY.
TIRE FASTENER.

No. 398,398. Patented Feb. 26, 1889.

WITNESSES:

INVENTOR,
George W. Huckabay
BY
Frank A. Fouts
ATTORNEY,

UNITED STATES PATENT OFFICE.

GEORGE W. HUCKABAY, OF GARFIELD, LOUISIANA.

TIRE-FASTENER.

SPECIFICATION forming part of Letters Patent No. 398,398, dated February 26, 1889.

Application filed September 12, 1888. Serial No. 285,202. (No model.)

*To all whom it may concern:*

Be it known that I, GEORGE W. HUCKABAY, a citizen of the United States, and a resident of Garfield, in the parish of Caddo and State of Louisiana, have invented certain new and useful Tire-Fasteners, of which the following is a specification.

The object of my invention is to provide a vehicle-wheel with a cheap, simple, and effective tire-fastener; and it consists in the parts which will be hereinafter described, and pointed out in the claim.

Reference is herein had to the accompanying drawings, forming a part of this specification, in which similar letters of reference indicate corresponding parts in the several figures.

Figure 1:
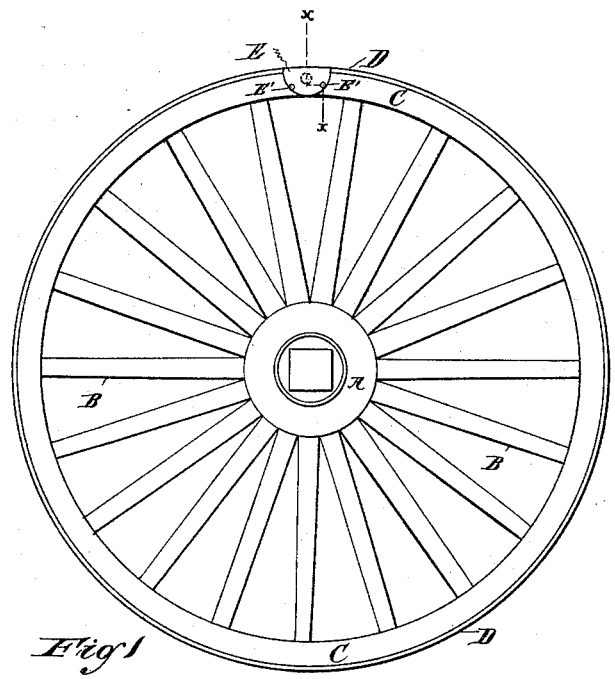
Figures 2, 3:
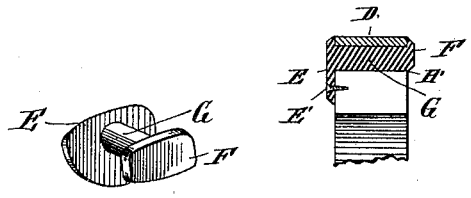

Figure 1 represents a side elevation of a vehicle-wheel with one of my tire-fasteners in position. Fig. 2 is a perspective view of the fastener, and Fig. 3 is a cross-section taken on the line $x\ x$ of Fig. 1.

A represents a hub of a wheel; B, the spokes; C, the felly, and D the tire. The fastener consists of two parallel side pieces or plates, E F, and a connecting-shank, G, formed integral with said plates.

For the convenience of description, the fastener will be referred to in the matter of position as it appears in the drawings. The planes of the plates are at right angles to the axis of the shank, and the plate E extends downward below said shank, while the under side of the plate F is cut away flush with the under side of the shank. Each plate extends upward a distance equal to the thickness of the tire, and the edge of each plate is beveled, as shown. The downwardly-extending part of the plate E is provided with one or more openings for the reception of nails or screws H, for securing the fastener to the felly. The outer face of the plate E is provided with two recesses or sockets, E', for the reception of a suitable wrench for turning the fastener.

Only one fastener is shown on the wheel in the drawings. It is intended, however, to fix a fastener so that there shall not be more than two spokes between each of said fasteners, and there should be a fastener at each felly-joint. There is a cross-opening, H', at each felly-joint for the reception of the shank of a fastener, and said fastener thereby operates as a lock for the adjacent ends of two sections of the felly—that is to say, each opening H' is formed part in one end of a felly and a part in the end of the adjacent felly, and said opening communicates with the periphery of the felly, as shown in Fig. 3.

The operation is as follows: Before a tire is placed on a wheel the fasteners are secured at suitable distances apart in the openings H' in the felly. The fastener is at first placed in a reverse position from that shown in Fig. 3, so that the longer side of the plate E shall extend outward from the felly. This reverse position of the fastener will cause the short wing of the plate E, together with the wing of the plate F, to lie downward out of the way of the tire. When the longer side of the plate E is extended outward, a tire may be removed or placed on the felly at pleasure. By turning said longer side downward to the position shown in Figs. 1 and 3 the tire is locked and secured between the plates E and F.

Having described my invention, I claim as new and desire to secure by Letters Patent of the United States—

As an improved article of manufacture, the tire-fastener described, comprising in a single element a shank, G, and two elongated plates, E F, both of said plates extending at substantially right angles to the axis of the shank, the plate E extending upon both sides of the shank and the plate F extending upon one side equal to the thickness of the tire, and the opposite side flush with the under side of the shank, and the downwardly-extended portion of the plate E formed with suitable holes, substantially as and for the purpose specified.

Signed at New York, in the county of New York and State of New York, this 10th day of September, A. D. 1888.

GEORGE W. HUCKABAY.

Witnesses:
J. P. SCOTT,
FRANK A. FOUTS.